Figure 1:
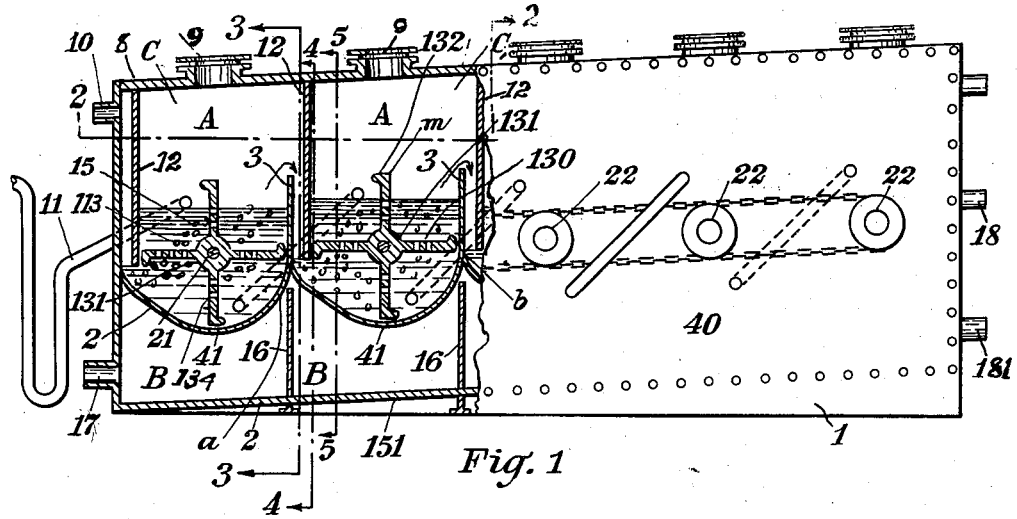

Dec. 19, 1939.  G. T. REICH  2,183,943

DEVICE FOR THE RECOVERY OF CARBON DIOXIDE GAS

Filed Dec. 15, 1936  4 Sheets-Sheet 1

INVENTOR.
Gustave T. Reich
BY
Mark W. Collet.
ATTORNEY.

Dec. 19, 1939.　　　　　G. T. REICH　　　　　2,183,943

DEVICE FOR THE RECOVERY OF CARBON DIOXIDE GAS

Filed Dec. 15, 1936　　　4 Sheets-Sheet 2

INVENTOR.
Gustave T. Reich
BY
ATTORNEY.

Dec. 19, 1939.   G. T. REICH   2,183,943
DEVICE FOR THE RECOVERY OF CARBON DIOXIDE GAS
Filed Dec. 15, 1936   4 Sheets-Sheet 3
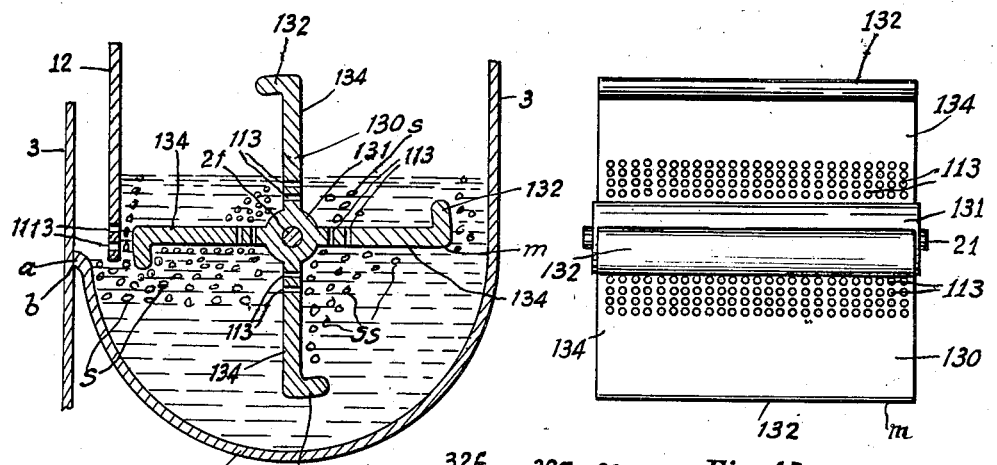
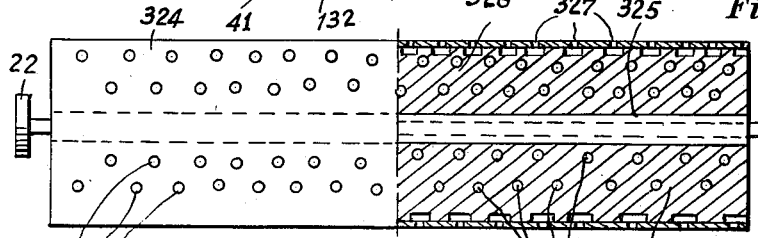
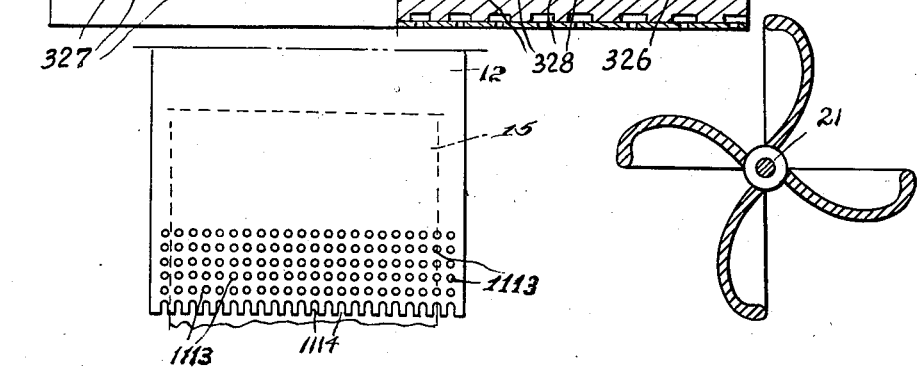
Fig.11.   Fig.16
Inventor
Gustave T. Reich
By Mark W. Collet
Attorney Dec. 19, 1939.   G. T. REICH   2,183,943
DEVICE FOR THE RECOVERY OF CARBON DIOXIDE GAS
Filed Dec. 15, 1936   4 Sheets-Sheet 4

Inventor
Gustave T. Reich
By Mark W. Collet
Attorney

Patented Dec. 19, 1939

2,183,943

UNITED STATES PATENT OFFICE 2,183,943

DEVICE FOR THE RECOVERY OF CARBON DIOXIDE GAS

Gustave T. Reich, Philadelphia, Pa.

Application December 15, 1936, Serial No. 116,041

19 Claims. (Cl. 261—93)

The present device may be used to treat materials in a fluid state, one of which materials is a gas, and may be used not only in the treatment of freely flowing liquids, but in the treatment of liquid in a viscous condition, or containing suspended matter, or even in treating materials usually solid, when rendered molten. It may also be used in treating vapors. The treatment to which materials may be subjected in my device are various, such as absorption, halogenation, hydrogenation, oxidization, chlorination and other gas and liquid treatments, wherein the gases and liquids act mutually upon each other.

Among the objects of my invention are economy of space and capital investment, securing intimacy of contact between and a thorough blending of the materials, increasing the rapidity of the mixing of the materials, producing an adjustability to operate on different types of materials, for instance, on liquids of different thickness or viscosity, to enable the machine to avoid dilution of any materials operated upon, and other objects that will appear as the specification is read. I can also include in the machine provisions by which light can be admitted to, or excluded from the materials in treatment and to enable the addition to or removal from its various chambers of material.

The machine comprises a series of chambers in which the materials are treated, and into which pass successively, the materials treated. One material passes from one chamber to another in one direction, through a series of chambers sufficient in number to accomplish the desired effect, while another material passes through this series in countercurrent. Either or both of such materials may be acted upon chemically or physically, and in acting on any material all or only some of the chambers may be utilized. The machine contains means that may be fashioned in various forms for agitating or retarding the flow of liquid or gaseous materials through the series of chambers. Heat exchange also may be provided by which the materials treated or one or more of them may be heated or cooled. Devices for this purpose may convey heated materials into one or more of the chambers, or may be arranged to heat or cool them without introducing any additional material into them. These chambers are separated by baffles extending downward below the level of the liquid that flows through the chambers successively, so that a gaseous material, passing in countercurrent to the liquid, through these chambers, successively, will bubble through the liquid as it passes from one chamber to the next. Both or either of these partitions or baffles may be adjustable to regulate the flow of material in either direction. The chambers may have the top covered by a material that permits the passage of light rays to assist the reactions produced. When the chambers are closed, a pressure either above or below atmosphere may be maintained. The chambers may be formed by dividing a large vessel, or of structures suitably connected together.

In the form of my apparatus that I regard as most perfect, the baffles between the chambers break up the gases as they pass from one chamber into the next into small particles that pass in small bubbles through the liquid. These baffles are substantially impervious to gases above the liquid level maintained in the chamber into which the gases pass, but the baffles, at their edges, or at their parts below this liquid level are fashioned to allow the gas to pass, in a finely divided state, below them or through the parts of them below this liquid level or in both manners. Various constructions are described below, but many variations may be made from those so described without departing from my invention. Especially in the preferred form of my apparatus, the agitation mechanism co-acting with the baffles above referred to, is designed so that it will catch the bubbles, as they enter the chamber in which it is positioned, and draw them down through the liquid. These agitators are made in various forms, a number of which I have described below, but other forms than those described below may be devised, without departing from my invention. The agitators contain elements that depress the gas bubbles that had passed under or through the lower part of the baffles, and allow them to bubble through the liquid after they had been pressed down into it by the agitator.

In many cases, especially in the use of the machine as an absorber of a portion of the gases treated, a portion of the gas being absorbed in the chamber into which the gas enters first, the unabsorbed portion, passing thence into the next chamber, will be of less than the original gas volume. Hence the flow of gas or vapor will become less and slower as it approaches the exit port, giving an opportunity for a longer agitation as it approaches this port.

The structural details of the best form of my machine contained in the following portion of my specification, even though not expressly denominated preferred forms, or as details used in practice, or similarly, are not to be taken as limiting necessarily, my invention thus described.

Figure 2:
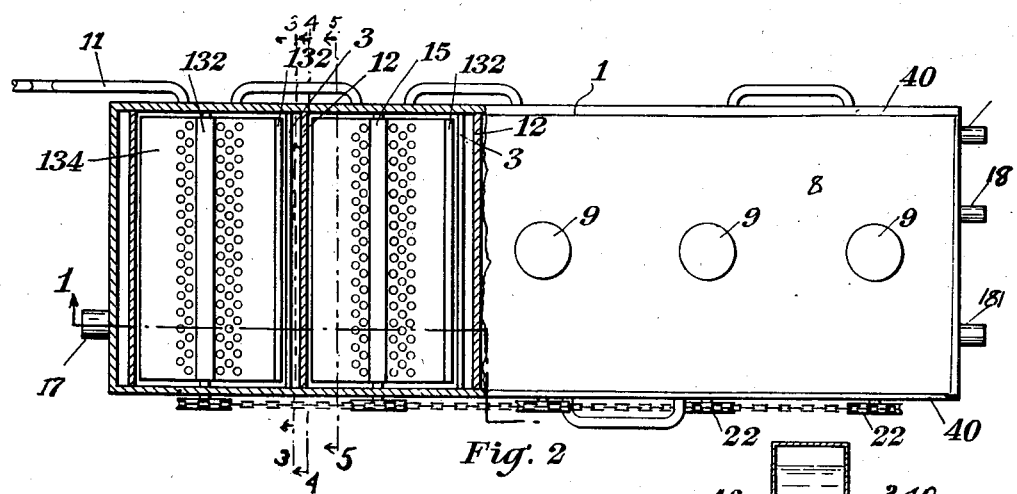
Figure 7:
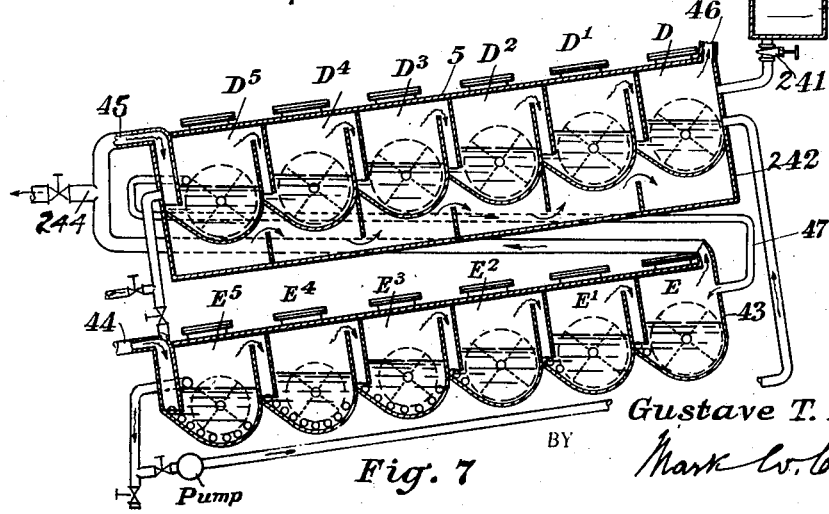
Figure 3:
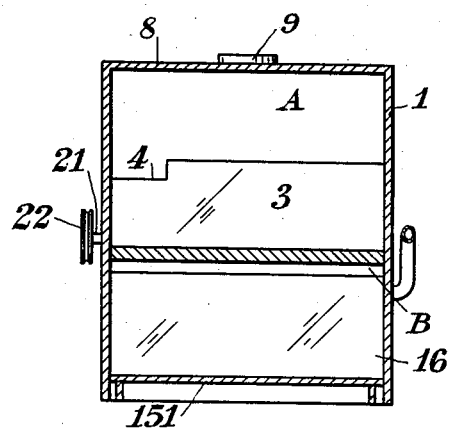
Figure 4:
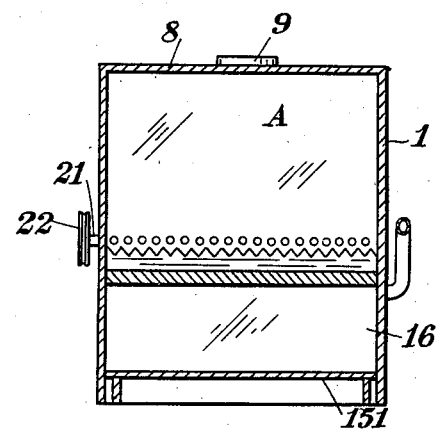
Figure 6:
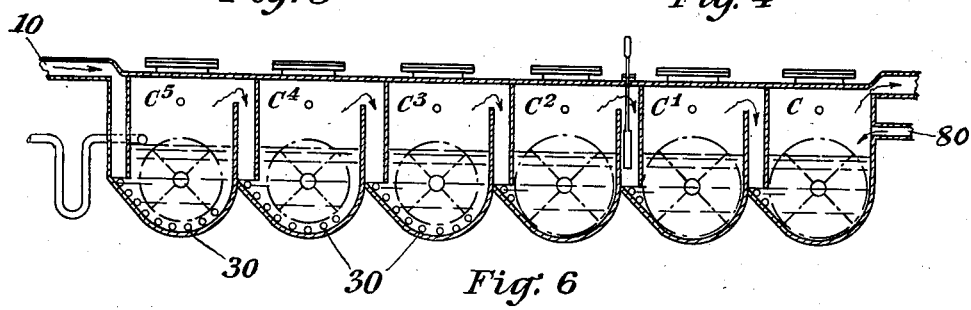
Figure 5:
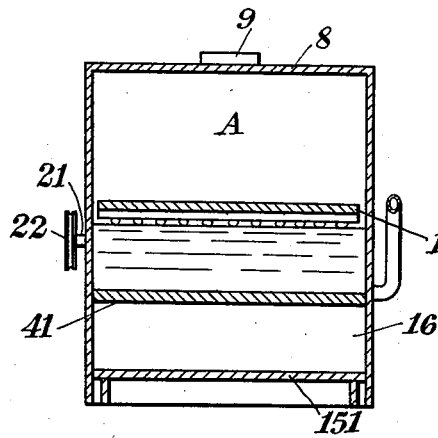
Figure 17:
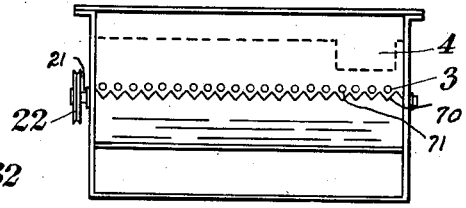
Figure 15:
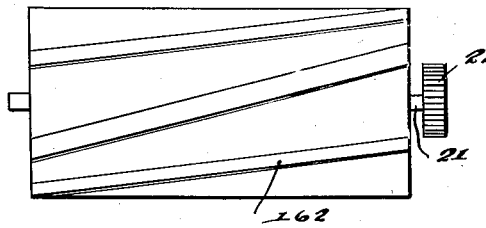
Figure 12:
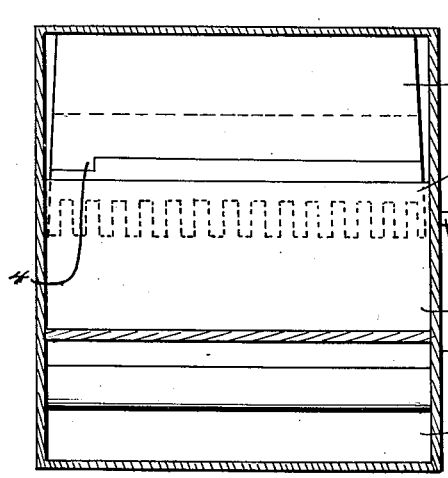
Figure 13:
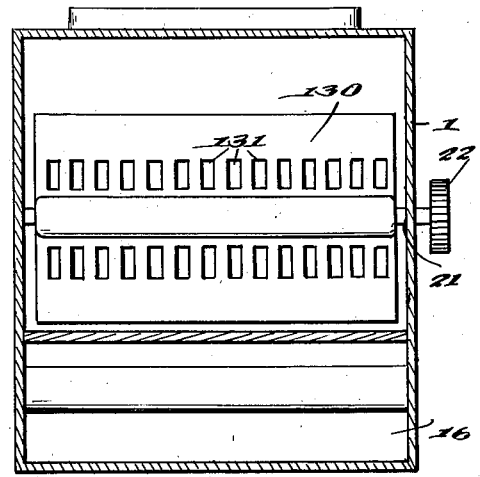
Figure 14:
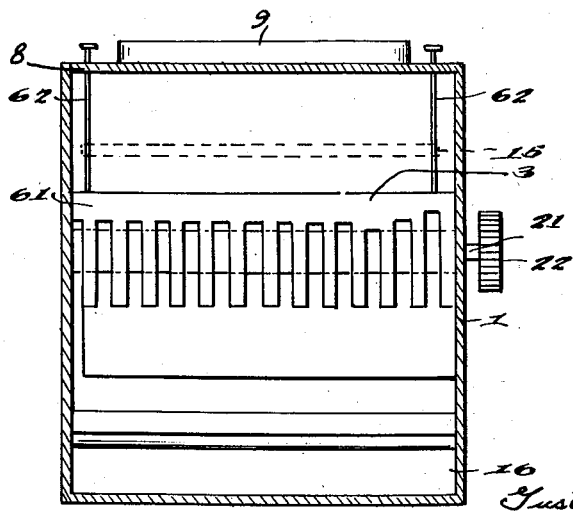

Fig. 1 is partly an elevation of my machine, the left end side of the figure being a section on the line 1—1 of Fig. 2. Fig. 2 is partly a plan view of my machine, the left end side of the figure being a section on the line 2—2 of Fig. 1. Fig. 3 is a section on line 3—3 of Fig. 1 and Fig. 2. Fig. 4 is a section on line 4—4 of Fig. 1 and Fig. 2. Fig. 5 is a section on line 5—5 of Fig. 1 and Fig. 2. Fig. 6 is a vertical section of a modified form of my machine. Fig. 7 is a vertical section of another modified form of my machine. Fig. 8 is a view showing, at its left side, an elevation, and at its right, a vertical section of a modified form of agitator. Fig. 9 is a vertical section, enlarged, of a chamber showing also in vertical section, the preferred form of agitator. Fig. 10 is plan view, enlarged, of the preferred form of agitator. Fig. 11 is an elevation of the preferred baffle, the agitator being shown in dotted lines behind the baffle, which is shown in full lines. Fig. 12 is a section showing the cut down portion of the partition separating the chambers, the agitator being shown as lying behind it in dotted lines. Fig. 13 shows a vertically adjustable form of baffle, the position of the agitator being indicated in dotted lines. Fig. 14 shows an agitator with large holes positioned in a chamber that is shown in section. Fig. 15 is an elevation of a modified form of agitator, and Fig. 16 is a section of another modified form of agitator, and Fig. 17 is a view of a slightly modified form of baffle and of partition 3, the latter being shown in dotted lines behind it.

My device in the preferred form shown especially in Figs. 1, 2, 3, 4 and 5 consists of a rectangular elongated vessel 1 that may be constructed of any material having the needful strength and resistance to heat, pressure and corrosive action. I have illustrated this vessel 1, as divided horizontally by a partition 2 into an upper section A in which the materials are treated and a lower section B where heat may be applied. The partition 2 separates completely the sections A and B and extends from side to side of the vessel 1. The partition 2 designated as a whole forms the bottom of compartments C, C1, C2, C3 and C4, which form the chambers in which the treatment of the gas and liquid occurs. Partitions 3, 3, dam the liquid in one compartment from the next. In practice, the walls of these compartments that form their bottoms and parts of their sides are trough shaped pieces 41 extending crosswise between the sides 40 of the vessel 1, and welded, bolted, or otherwise secured to them, and the ends a being bolted or brazed to the sides of the adjacent trough shaped piece at a point b, each trough shaped piece being secured at the edges contacting with the sides of the vessel 1, by bolting, brazing or other suitable means. This construction may provide a rounded bottom for each compartment and so aid in producing a thorough agitation of the liquid and mixing of the gas with it. A depression 4, (see especially Fig. 3) may be made at the upper edge of the partition 3.

The top of the machine may be a plate 8 secured suitably to the sides of vessel 1. If bolted on, it may be removed readily. In this cover may be placed openings and cover plates 9, which latter may be of transparent material. A liquid inlet port 18 is placed at one end of the vessel 1, and a liquid outlet port 11 at the other. Adjacent to the partition 3 is the baffle 12, which dips down into the liquid at the lower edge, and, in conjunction with the partition forms a liquid seal between two chambers. The gas passing between these chambers passes through this seal. Preferably the baffle 12 is positioned close to the partition 3 and the planes of the two elements are substantially parallel. The baffles extend across and to the top of the vessel 1 fitting substantially close to the sides 1 and the top plate 8. The baffles 12 are not necessarily fastened either to the top plate or sides, but should not allow any substantial leakage of gas between their edges.

The baffles 16, 16, may extend upward from the bottom 151 of the lower compartment B. Extending upward between the bulging bottom of the compartments C, they compel the heating material, hot air, steam, water, etc. to follow closely the bottoms of the compartments C. The heating material may enter at either of the ports 17 or 181 and leave by the other.

The forms of baffle illustrated are especially efficient, and may be used in any modification of my device. The baffle 12, shown especially in Fig. 11 is perforated with numerous small holes 1113, 1113, and is slotted upward from its lower edge 1114. These holes and slots are placed below the level of the liquid in the chamber C into which they lead. They prevent the gas from entering this chamber in large volume at any one place, and distribute it in small bubbles over the side of the baffle and beneath the liquid level in the chamber. The agitator has blades 130 that extend radially from the hub 131, and, at their outer edges, m, have an enclosing and catching element that may be in the form of a lip 132, or other suitable scoop form may be used. Between the enclosing and catching element 132, the blades 130 of the agitator have a series of holes 113 through which the gas can pass in small bubbles. Preferably the part 134 of the blades 130 nearest the lip 132 is imperforate, the holes being confined to the portions nearest the hub 131.

The axis of revolution of the agitator, to obtain optimum results, should be parallel to and a little below the liquid level of the chamber, enough below this level to cause the imperforate portion of the blade to catch and imprison the bubbles in the space. The number of holes in the perforated portion of the blades and the relative extent of the perforated and imperforated portions, vary according to the method of treatment and the materials treated. The lip 132 should revolve close enough to the baffle 12 to catch and imprison a large proportion of the bubbles S, S.

The above construction and positioning of the baffle is applicable to all forms of the construction of my device. I do not limit myself to its mechanical details as these may vary; some of these variations being illustrated and described below as modifications.

The agitator 15 is mounted on a shaft 21 that has bearings at the sides of the vessel 1. An end of the shaft 21 passes through the side wall of the vessel 1, and is provided with a sprocket or driving wheel 22, or other suitable driving device. This driving mechanism may permit a turning of the agitator in either direction; however, the agitator will ordinarily be driven so that the blade in the gas space above the liquid level will turn through the gas toward the baffle, and the blade immersed in the liquid away from the baffle; the passage of the blades through each of these materials being in the opposite direction of flow of the material through which they are passing. Among other advantages, a retardation of the flow of the gases and liquid through the chamber will be produced.

The agitators, ordinarily, are revolved at a speed of about 600 R. P. M. though this speed is varied according to the materials to be treated. A speed of 150–300 or even less gives a very good result where a very viscous solution is treated. The holes through the blades may be omitted in some circumstances, according to the materials to be treated, depending upon the purity of the gas or the viscosity of the liquid.

The machine described in detail above is operated by introducing a liquid into the compartments through the port 18 filling them gradually up to the liquid level, controlled by the partitions 3. Either simultaneously or when the compartments have become filled with liquid, the gaseous material (or vapor) may be introduced through the port 10. This gas or vapor passes into the various compartments of the machine and, when the balance between the gas and liquid is reached, the gas or vapor will occupy the upper part of the chambers and the liquid their lower portion and the operation of the gas or vapor and the liquid upon each other will occur fully.

If the chambers are to be treated or cooled during this operation, the heating fluid, either a liquid or a gas, is introduced into the portion B of the machine below the chambers, through either port 17 or 181. This gas or liquid will be compelled by the partitions to circulate close to the outside of the bottom walls of the chambers, and produce the desired cooling or heating.

The gas to be treated passes through the baffles or under their lower edges from one chamber to the next. In so doing, it is forced or drawn through the liquid seal between the chambers, and is received into the latter chamber below the liquid level therein, and in the preferred form of my machine in small bubbles that are collected by the agitator, and are brought thoroughly into contact with the liquid.

The liquid is dammed in each chamber to a fixed level. It is introduced into a compartment, flows over the partition 3 between the compartments. It may be given an additional movement crosswise of compartment by the depressions 4, 4, in the partitions 3, as previously described; through the partition 3, damming the liquid, so that its level in any compartment is above the holes in the baffle, if any, or if it has no holes, above the lower edge of the baffle, a liquid seal is maintained between the chambers, through which the gas is driven or drawn. The gases are violently agitated by the blades of the agitator, as is also the liquid in the lower part of the chambers. The passing of the blades of the agitator through, oppositely to the general flow of both gases and liquid holds back the flow of each material, and a thorough commingling of each one is aided thereby and by the retarding of their flow and time of contact of and mutual action on each other is increased.

The scoop shaped blades of the agitator, by catching and imprisoning the gas bubbles S, S, and, by the turning of the blades, causing them to travel along the lower side of the blade towards the hub, discharges the bubbles through the blades, finely divided, into the liquid below its level, so that the gas starts its upward travel through the liquid in fine bubbles from a point well below the liquid level of the chamber. The final result is a very thorough commingling of the gas and liquid.

The volume of the gas, in almost every case, diminishes as it passes through the machine. Generally, it will become partly absorbed in the liquid. The particles of gas will remain longer in each compartment, successively, as it passes from one end to the other of the machine. A more complete washing or absorption of the gas will occur in the later compartments. The liquid will be cleaner and more absorbent.

In Fig. 6 is shown a modification of the machine where the materials are heated or cooled by a series of pipes, 30, 30, 30, positioned within the chambers in position where they will heat or cool the materials to be treated; as shown, they are arranged beneath the agitator, but, by varying their distribution, the heating or cooling of the various chambers may be varied; in the illustration, the pipes 30, 30, 30, are shown having less area toward the left than toward the right, and absent entirely at the extreme right. Frequently indeed, no heat interchange apparatus need be employed in my machine. In this modification, the liquid level in the chambers is the same throughout the machine. The decision whether the various chambers are to be heated, cooled or left unaffected by heat exchange apparatus depends, in part, upon whether there is an exothermic or endothermic reaction in the chambers. A modified form of my device is shown in Fig. 7 in which vessels containing compartments are placed one above the other. The liquid is contained in tank 240, and its flow into the machine is controlled by the valve 241, where it flows into the compartment D of the vessel 242, and passes thence into the other compartments D1, D2, etc. and then passes, through pipe 47 to the compartment E, of the vessel 43. Thence it passes through the compartments E1, E2, E3, E4, and E5 successively. The gaseous material enters the port 44 or 244 and flows in countercurrent to the liquid and passes by the pipe 45 to the compartment D5 of the vessel 242, and finally passes out of the machine by the port 46. The heat exchange apparatus is shown in the upper set of compartments and is similar to that shown in Fig. 1, and in the lower as shown in Fig. 6.

The agitator may be used in various constructions, as in Fig. 8 where the blades are perforated throughout, in Fig. 15 where the blades 162 are inclined imperforate and extending outward from the shaft 21, which is driven by the wheel 22, or again in Fig. 16, where curved blades are shown. Other forms may be made, provided they catch and submerge the small gas bubbles passing through or beneath the baffles. Any of these forms may be used, but the form indicated in Figs. 1 and 2 and shown in detail in Figs. 10 and 11 is preferred.

In Fig. 14 a modification is shown where the baffle may be in two pieces, fitting closely to each other; the piece may be lifted and lowered by the hangers 62, 62.

The efficiency in use of the instant device over devices previously known and used commercially may be illustrated by the instance of its use in absorbing carbon dioxide from flue gases. The flue gas produced by burning coke for the production of carbon dioxide contains approximately 18% of carbon dioxide. It is customary to use, for the production of ten tons of liquid carbon dioxide per day, two absorption towers 8′ diameter, 100′ high, and nevertheless, even with the use of these absorption towers, the flue gas cannot be stripped of all of its carbon dioxide content, but 50% can be removed by such an installation, so that the exit gas leaving the absorption towers still contains about 9% of carbon dioxide gas. My device can take these exit gases that have come out of the absorption towers, containing this 9% of carbon dioxide gas and remove 85% of it, absorbing this gas into the liquid in my machine, wasting therefore, less than 0.8% of the total carbon dioxide gas coming off from the coke combustion, or I can use it directly without interposing towers on the gases from the combustion with like result, in all cases, wasting less than 1% of the carbon dioxide gas arising from the combustion.

Fig. 17 illustrates a form of baffle that has a serrated lower edge 70 and a series of perforations 71, the end plate of the device being removed.

It is to be noted that the form of agitator shown in Fig. 8 is shown diagrammatically in Figs. 6 and 7. This form of agitator has a perforated cylinder 324 between which and a sleeve 325 extend two radially extending fins 326, which are secured to both sleeve and cylinder. The sleeve 325 surrounds and is fastened to the shaft 21 and the fins 326 extend between it and the interior of the wall of the cylinder 324. The cylinder 324 is perforated with a large number of holes 327, and the fins are likewise perforated by a large number of holes 328. The liquid enters the space within the cylinder by the holes 327 and is in part carried down by the fins 326 and partly passes through them, and finally passes out of the agitator by passing out through other holes of the cylinder 324.

Having described my invention, I declare I am not limited by any other limitations than those imposed by my claims.

I claim:

1. In an apparatus for treating liquid and gaseous materials in countercurrent with agitation, having a series of closed chambers, liquid sealed from each other by upwardly projecting partitions and downwardly projecting baffles, thereby maintaining the liquid level therein at a fixed level, the partitions and the baffles overlapping, a series of rotating agitators placed in said chambers, each comprising a shaft and a number of radially extending blades, each blade having a scoop shaped portion near its edge, and a perforated portion between the scoop shaped portion and the shaft of the agitator.

2. An apparatus for treating gaseous and liquid materials flowing in countercurrent, comprising a series of chambers closed against the entrance of exterior air communicating with each other, but sealed from each other by liquid means, comprising a downwardly extending baffle extending downward below the liquid level in the chamber, and a partition extending above the lower edge of the baffle, agitators positioned in said chambers, and heat exchange devices controlling the temperatures of said chambers, the temperature controlling materials being isolated from the materials in the compartments.

3. In an apparatus for treating liquid and gaseous materials, the combination of a chamber, means for passing the gases and liquid in countercurrent through the chamber, means for retaining the liquid therein at a desired level, comprising a baffle extending downward into said chamber, to a point below the liquid level therein, said baffle having a series of gas dispersing devices situated below the liquid level in the chamber, and an agitator positioned in said chamber and having a scoop extending close enough to the baffle to catch hold of and submerge the dispersed gases.

4. A machine for treating gases and liquids in countercurrent, comprising a series of closed chambers liquid sealed from each other, partitions for maintaining the liquid level in said chambers, means for driving the gases through the liquid seals in a dispersed condition, comprising baffles having gas dispersing devices situated at a lower level than the liquid level in said chambers, and revolving agitators placed in the chambers having blades extending radially from the axes positioned to revolve downward, and with the edges of the blades closely adjacent to the baffle at which the gases enter the chambers.

5. The machine defined in claim 4 wherein the closed chambers have a rounded bottom adjacent to which the edges of the radially projecting arms of the agitators rotate, in combination with a chamber exterior to and enclosing the chambers in which the agitators are situated, and provided with upwardly projecting partitions placed between said chambers containing the agitators and extending higher than the bottom of said chambers.

6. A machine for absorbing gases, comprising a series of communicating chambers, liquid sealed between the chambers, an entrance port for the solution and an exit port for the solution, an entrance port for the gases placed adjacent to the exit port for the solution, and an exit port for gases placed adjacent to the entrance port for the solution, whereby a flow of gases and solution takes place in countercurrent through the series of chambers, means for driving the gases through the liquid seals, a series of agitators placed in the chambers, the ratio of the speed of the agitators to the speed of the flow of the gases being greater in the chambers nearer the exit port of the gases.

7. The machine defined in claim 6 wherein the increase in ratio of the speed of the agitators to the speed of flow of the gases therein referred to increases from one chamber to the next throughout the series.

8. A gas and liquid contact device comprising a relatively elongated treating chamber, a liquid inlet and outlet port and a gas inlet and outlet port in said chamber, so positioned as to allow liquid to flow in one direction and gas in the opposite direction through said chamber, a plurality of spaced sets of baffles, each set comprising an upwardly and a downwardly extending baffle secured respectively to the bottom and top of said chamber, thereby forming a plurality of liquid sealed compartments, a bladed agitator journaled in each compartment, transversely of the fluid flow, and so positioned and rotated that the blades thereof move downwardly adjacent to the downwardly extending baffle, whereby gas bubbling beneath the lower edge of said baffle is arrested in its upward flow.

9. A machine for treating gases and liquids in counter-current, comprising a series of closed chambers, communicating with each other, liquid seals between the chambers, consisting of a partition extending upward from the lower part and a baffle extending downward from the top of the chamber and overlapping the partition, means for driving the gases in a comminuted condition through the liquid seal, agitators in said chambers, said agitators including a revolving shaft extending substantially horizontally crosswise in said chamber near the level of the lower part of the baffle, and having radially extending blades, the extremities of which pass closely adjacent to the lower portion of said baffle, said chambers having at their bottoms the contour of a cylindrical surface substantially coaxial with the axis of the agitator and lying away from it slightly more than the radial extension of said blades.

10. The machine defined in claim 9 wherein an additional closed compartment is placed below the rounded bottom of a series of said chambers, and an upwardly extending partition extends upward between the curve formed walls of the bottom portions of said chambers, said additional closed compartment extending beneath said chambers and means for driving a heating fluid through said compartment.

11. A machine for absorbing gases in a solution, comprising a series of chambers united into a single structure, the bottom walls of said chambers having the contour of a semi-circumference of a cylinder, the axis of which is horizontal, an upwardly extending partition integral with the bottom of a chamber partly separating one chamber from the next, the side walls of said series of chambers consisting each of a sheet of metal to which the bottom walls of the chambers and the upwardly extending partitions are secured, a cover for said series of chambers, baffles extending downward from said cover and overlapping the upwardly extending partitions and a series of rotating agitators placed in the chambers and having their axes substantially horizontal.

12. A machine for treating gases and liquids in counter-current, comprising a series of closed chambers, communicating with each other, liquid seals between the chambers, consisting of a partition extending upward from the lower part and a baffle extending downward from the top of the chamber and overlapping the partition, means for driving the gases in a comminuted condition through the liquid seal, agitators in said chambers, said agitators including a revolving shaft extending substantially horizontally crosswise in said chamber near the level of the lower part of the baffle, and having radially extending blades, the extremities of which pass closely adjacent to the lower portion of said baffle, said chambers having at their bottoms the contour of a cylindrical surface substantially coaxial with the axis of the agitator and lying away from it slightly more than the radial extension of said blades.

13. The machine defined in claim 12, wherein an additional closed compartment is placed below the rounded bottom of a series of said chambers, and an upwardly extending partition extends upward between the curve formed walls of the bottom portions of said chambers, said additional closed compartment extending beneath said chambers and means for driving a heated fluid through said compartment.

14. A machine for absorbing gases in a solution, comprising a series of chambers united into a single structure, the bottom walls of said chambers having the contour of a semi-circumference of a cylinder, the axis of which is horizontal, an upwardly extending partition integral with the bottom of a chamber partly separating one chamber from the next, the side walls of said series of chambers consisting each of a sheet of metal to which the bottom walls of the chambers and the upwardly extending partitions are secured, a cover for said series of chambers, baffles extending downward from said cover and overlapping the upwardly extending partitions, and a series of rotating agitators placed in the chambers and having their axes substantially horizontal.

15. In an apparatus for treating liquid and gaseous materials in counter-current to each other, the combination of a chamber, means for maintaining a fixed liquid level therein, a baffle carrying the gaseous material below the liquid level, and an agitator having blades revolving downward and closely adjacent to the baffle, the axis of the agitator being substantially at the liquid level, so that the uppermost blades of the agitator revolve in the gaseous material and the lowermost blades revolve in the liquid material.

16. An apparatus for treating liquid and gaseous materials passing in countercurrent therethrough, the combination of a chamber, means for maintaining a constant level therein, a baffle provided with gas dispersing devices, and an agitator provided with blades revolving downward and closely adjacent to the baffle, the axis of the agitator being substantially at the liquid level, so that the uppermost blades of the agitator revolve in the gaseous material, and the lowermost blades revolve in the liquid material.

17. An apparatus for treating gaseous and liquid materials flowing in countercurrent, comprising a series of compartments, closed against the entrance of exterior air, communicating with each other but sealed from each other by liquid sealing means, comprising a downwardly extending baffle extending downward below the liquid level in the compartment, and a partition extending above the lower edge of the baffle, an agitator positioned in each compartment and heat exchange devices controlling the temperature of said compartments, the temperature controlling materials of said heat exchange devices being isolated from the materials in the compartments.

18. An apparatus for treating gaseous and liquid materials in countercurrent with each other, wherein the gaseous material passes through and over portions of the liquid material, comprising a covered vessel containing a series of compartments, and comprising also liquid seals between these compartments, each seal composed of a downwardly projecting baffle and extending from the cover of said vessel to a distance below the level of said liquid, and a partition extending upward from the bottom of said vessel and adjacent to said baffle to a point above the lower edge of said baffle, and rotating agitators positioned in the compartments, with their axes of rotation substantially at the level of the liquid in said compartment.

19. The devices defined in claim 18, wherein the vessel is inclined.

GUSTAVE T. REICH.